UNITED STATES PATENT OFFICE.

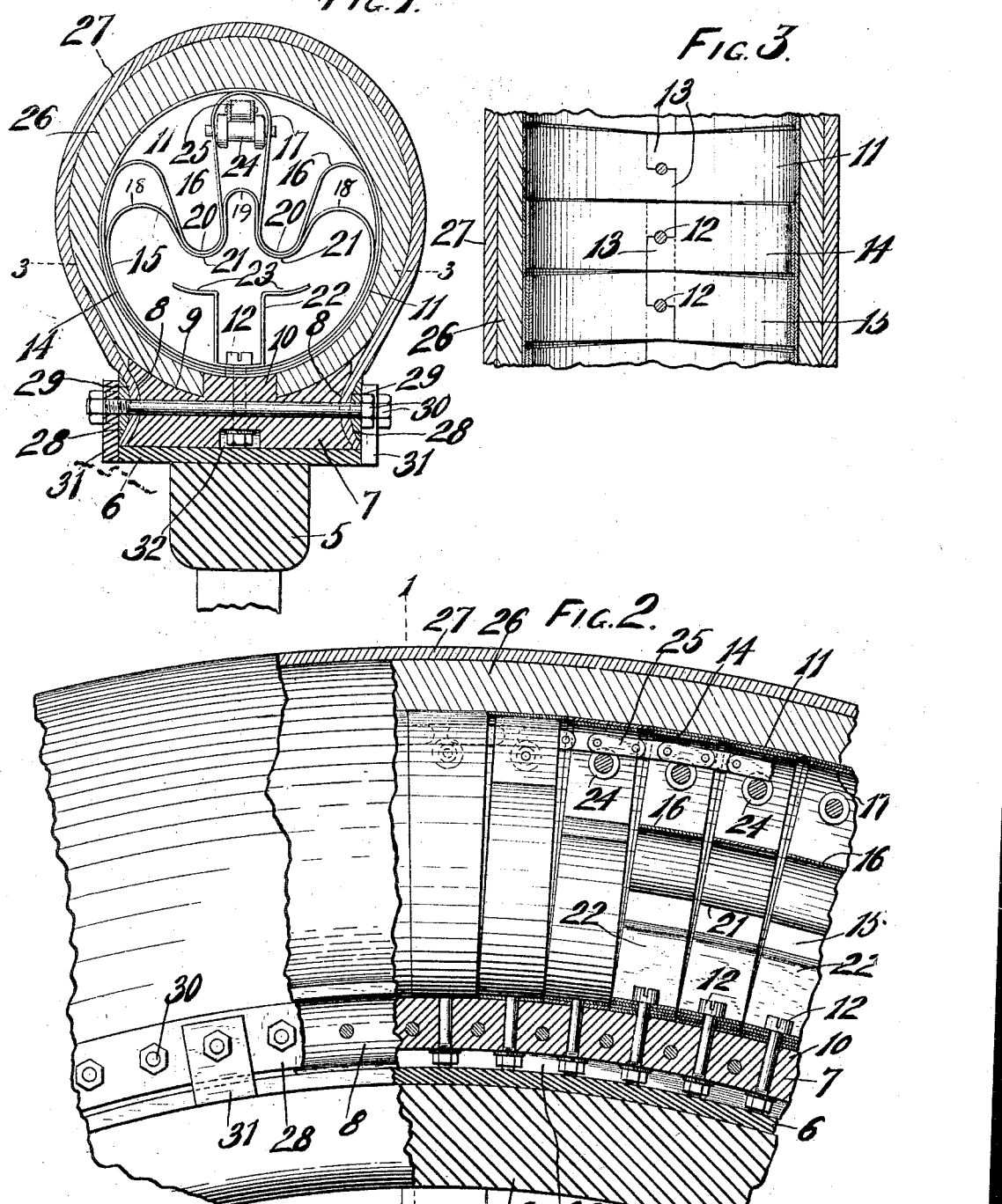

HARRISON A. FRY AND GUY J. BRUCE, OF SPRING LAKE, WISCONSIN.

CUSHION-TIRE.

1,044,512.　　　　　Specification of Letters Patent.　　Patented Nov. 19, 1912.

Application filed May 29, 1911. Serial No. 630,133.

*To all whom it may concern:*

Be it known that we, HARRISON A. FRY and GUY J. BRUCE, citizens of the United States, residing in Spring Lake, in the county of Waushara and State of Wisconsin, have invented new and useful Improvements in Cushion-Tires, of which the following is a description, reference being had to the accompanying drawings, which are a part of this specification.

This invention relates to improvements in cushion tires for vehicle wheels and more particularly adapted for automobile use.

It is one of the objects of this invention to provide a cushion tire which is simple in construction, efficient and durable in use and in which all of the desirable features of a pneumatic tire are present.

A further object of this invention is to provide a cushion tire with means for yieldingly holding the casing of the tire in expanded position and to prevent the depression of the casing beyond a certain extent.

A further object of the invention is to provide a cushion tire with means for distributing or equalizing the strain to all parts of the means for holding the tire in expanded position when a portion of the tire is depressed.

A further object of the invention is to provide a cushion tire with means for securely and removably fastening the casing, and other flexible portions of the tire to the rim so that parts may be easily replaced when desired.

With the above, and other objects in view, the invention consists of the cushion tire and its parts and combinations as set forth in the claim, and all equivalents thereof.

In the accompanying drawing in which the same reference characters indicate the same parts in all of the views: Figure 1 is a cross sectional view of the improved cushion tire taken on line 1—1 of Fig. 2;
Fig. 2 is a side elevation of a portion of the tire, parts broken away and other parts in section; and Fig. 3 is a longitudinal sectional view thereof taken on line 3—3 of Fig. 1 with parts removed and other parts in section.

Referring to the drawing the numeral 5 indicates the wheel felly and 6 the rim fastened thereto in any well known manner.

A tire holder 7 in the form of a band of aluminum or other metal having concave side edges 8 and a peripheral groove 9 with a medial circumferential projection 10 closely fits the periphery of the rim 6 and is adapted to have the tire fastened thereto. A series of resilient bands 11 of a diameter equal to the bore of the tire are placed on the periphery of the projection 10 and fastened thereto by bolts 12 which pass between the overlapping edges 13 of said bands. These bands increase in width radially outwardly so that the edges of adjacent bands closely abut each other and form substantially a yielding continuous tubular band extending around the projection 10. Mounted within each band is a resilient spring 14 and within the resilient spring is a core spring 15. Both of these springs have overlapping end portions which are offset with relation to each other, and the ends of the springs adjacent to the bands are also offset with relation to the edges of the bands and are held in the same manner by the bolt 12. The resilient springs are bent to form side loops 16 and a medial loop 17 which bears against the inner circumference of the band 11 at a point diametrically opposite the ends of said band and is adapted to yieldingly reinforce the band at this point and to take up or absorb vibration. Each core spring is also provided with side loops 18 and a medial loop 19 and these loops extend within the corresponding loops of the resilient springs 14 a short distance with the return bends 20 of the loops of the resilient springs engaging the return bends 21 of the loops of the core springs. The screws 12 also hold U shaped stop members 22 within the core springs and the end portions 23 of these members are bent outwardly to a position to be in the path of movement of the return loops 21 when the tire is unduly depressed or flattened to limit said depression.

The medial loops of the resilient springs have grooved rollers 24 journaled therein at points close to the outer portion of said loops and a chain 25 extends circumferentially around the tire and engages each roller so that when the tire is depressed at any point the portion of the chain adjacent thereto will be forced inwardly by its engagement with the medial loops and the strain will be transmitted to all of the other spring members and equalized.

The spring members are covered and protected by means of an inner and an outer tubular casing 26 and 27 respectively which are removably fastened to the rim. The inner casing is formed of felt, rubber or other material and the side edge portions thereof rest in the peripheral groove 9 of the tire holder with the side edges butting against the sides of the annular projection 10. The outer casing 27 is formed of canvas, rubber or other desirable material and extends around the inner casing and its side edge portions lap over the concave side edges 8 of the tire holder. Annular clamping rings 28 having convexed side faces 29 have their convexed faces bearing against the opposite side edge portions of the outer casing and the said casing is tightly clamped between said rings and the tire holder by means of bolts 30 which extend through the holding member, the casing, the clamping rings and through side plates 31.

The side plates extend beyond the inner periphery of the tire holder and engage the side edges of the rim 6 to prevent lateral movement of the holder on said rim. The inner periphery of the tire holder is provided with a groove 32 to accommodate the nuts of the bolts 12.

From the foregoing description it will be seen that a cushion tire is provided which has all the desirable attributes of the pneumatic tire and is strong and durable and may be easily repaired.

What we claim as our invention is:

A cushion tire, comprising a holder provided with concave side portions and a peripheral groove and having a medial circumferential projection, a series of resilient bands connected to the projection, resilient members positioned within the bands and provided with side loops and medial loops and with return bends, the medial loops bearing against the inner walls of the bands, resilient core members positioned within the resilient members and provided with loops and return bends, the return bends of both members engaging each other, stop members carried by the holder which are positioned to be engaged by the return bends of the core members, an inner casing covering the bands and the members and having its side edge portions extending into the peripheral groove of the holder, an outer casing covering the inner casing and extending into the concave side portions, clamping rings for clamping the side portions of the outer casing to concave side portions of the holders, and bolts clamping said clamping rings to the holder.

In testimony whereof, we affix our signatures, in presence of two witnesses.

HARRISON A. FRY.
GUY J. BRUCE.

Witnesses:
DANIEL T. LEISK,
FRANK LA SAGE.